United States Patent [19]

Kihlstedt et al.

[11] 4,234,380
[45] Nov. 18, 1980

[54] POLYMERIC SILICATE MATERIAL AND A METHOD OF MANUFACTURING THE SAME

[75] Inventors: Per G. Kihlstedt, Bromma; Hedvig E. B. Hässler, Enskede; Kai Ödeen, Lidingö, all of Sweden

[73] Assignee: Advanced Mineral Research AB, Stockholm, Sweden

[21] Appl. No.: 922,662

[22] Filed: Jul. 7, 1978

[30] Foreign Application Priority Data

Jul. 8, 1977 [SE] Sweden ................................ 7707999

[51] Int. Cl.³ .............................................. C04B 43/02
[52] U.S. Cl. .................................. 162/152; 106/40 R; 106/117; 106/118; 106/120; 106/121; 106/304; 106/306; 162/157 R; 252/62; 423/326; 423/328; 423/331
[58] Field of Search .................. 106/304, 306, 121, 50, 106/288 B, 60, 117, 46, 118, 120; 252/62; 162/157 R, 152; 423/155, 160, 161, 138, 148, 141, 150, 326, 327, 331, 328

[56] References Cited

U.S. PATENT DOCUMENTS

| | | | |
|---|---|---|---|
| 1,438,428 | 12/1922 | Dhe ........................ | 162/152 |
| 2,590,566 | 3/1952 | Osborn ..................... | 106/121 X |
| 2,926,997 | 3/1960 | Kalousek .................. | 423/331 X |
| 2,967,152 | 1/1961 | Matsch et al. ............ | 252/62 |
| 3,046,152 | 7/1962 | Shiraishi .................. | 106/306 |
| 3,264,130 | 8/1966 | Mays ........................ | 423/331 X |
| 3,463,607 | 8/1969 | Johnson et al. .......... | 423/331 |
| 3,567,481 | 3/1971 | Craig ....................... | 106/306 |
| 3,729,429 | 4/1973 | Robson ..................... | 423/328 X |
| 3,849,111 | 11/1974 | Kihlstedt ................. | 106/120 X |
| 3,915,734 | 10/1975 | Fitton ..................... | 106/306 |
| 4,039,625 | 8/1977 | Davis ....................... | 423/326 |
| 4,132,559 | 1/1979 | Kihlstedt et al. ....... | 106/117 |

FOREIGN PATENT DOCUMENTS 2717918 11/1977 Fed. Rep. of Germany ............. 106/60
2645555 4/1978 Fed. Rep. of Germany ............. 106/46

OTHER PUBLICATIONS

Webster's New Int'l. Dictionary, 2nd ed., unabridged (1960) "Granate", p. 1088.
Searle, A.B. *Refractory Materials* pub. 1950, Chas. Griffin & Co. Ltd, London, pp. 232-234.
Mason, B–Principles of Geochemistry, pp. 116, 96-101 (ibid).

Primary Examiner—Helen M. McCarthy
Attorney, Agent, or Firm—Fleit & Jacobson

[57] ABSTRACT

A polymeric silicate material having a substantially fibre- or flake-like microstructure is manufactured from a starting material comprising mainly natural or synthetic silicate mineral e.g., Olivine and/or Granate (garnet), having a hardness exceeding the value 6 on the Moh's hardness scale and which are compound(s) having the general formulae:

$$2(R^I O) \cdot SiO_2$$

wherein $R^I$ may be the same or different and is Mg and/or Fe; and $$3(R^{II}O) \cdot R_2^{III} O_3 \cdot 3 SiO_2$$

wherein $R^{II}$ may be the same or different and is Mg, Fe and/or Ca; and $R^{III}$ is Al or Fe, by finely dividing said material to a specific surface area of at least 15,000 cm²/cm³, measured according to Blaine, and subsequently hydrothermally treating the resultant powderous starting material at a temperature of approximately 175°–325° C. and a pH of at least 9 in the presence of water or condensed steam.

23 Claims, No Drawings

POLYMERIC SILICATE MATERIAL AND A METHOD OF MANUFACTURING THE SAME

The present invention relates to a novel and useful polymeric silicate material whose microstructure is of substantially fibre- or flake-form. The invention also relates to a method of manufacturing such a material. As with other fibrous material, for example materials made from animal fibres and fibres of the cellulose or glass-wool-type, the polymeric silicate material according to the invention is intended for use as a heat insulating material, by forming a highly porous material, and for producing paper-like or board-like webs or sheets.

With respect to organic fibres, the selection of raw materials for the manufacture of fibrous material has hitherto been limited by the fact that the demand for fibrous material exceeds the amount of fibrous raw materials which can be grown in the ground available. With regard to glass-wool-fibres, these are produced by means of a smelting operation requiring large amounts of energy, with subsequent spinning of the smelt whilst centrifuging the same. The structure of such glass-wool-fibre material is not fully satisfactory from the aspect of further manufacture and use, and considerable energy is consumed during the manufacture of said material.

An object of the present invention is to provide a novel and useful material based on a raw material of practically unlimited supply and which can replace, to a substantial extent, hitherto available fibrous materials, and which can be manufactured at relatively low cost.

According to the present invention, which is more clearly defined in the accompanying claims, the fibre material is produced by crystallizing suitably composed hydrosilicates of primarily MgO, FeO, $Al_2O_3$ and/or $Fe_2O_3$. It has been found that such crystallization can be effected by supplying steam at a temperature of approximately 175° to 325° C. and elevated pressure, for example in an autoclave, the condensate serving as a diffusion phase. In order to render the silicate sufficiently soluble in water, in order for the chemical reaction between the occurring ions to take place, it is necessary to maintain a relatively high pH, i.e. a pH higher than 9. Olivine has been found to afford a sufficiently high pH, namely approximately 10. Otherwise, the pH should be increased to the extent desired by adding a suitable hydroxide, primarily $Mg(OH)_2$, or optionally $Ca(OH)_2$ in the form of burned and slaked magnesite, dolomite and/or calcite.

The motive power by which such silicate polymerization is effected through the formation of metal oxide-silicate hydrates is apparently taken from the high energy content of the starting material. Such high energy contents are characterized by strong cohesion, i.e. a high degree of hardness, measured for example according to Moh's hardness scale. The formed polymeric silicate minerals of silicate-hydrate type have a comparatively low surface energy, similar to that of natural minerals of the mica, talcum or clay type.

A suitable starting material for the polymerization process is, for example, natural or synthetic olivine $(2R^IO)SiO_2$, where $R^I$ may be the elements Mg and/or Fe). Another suitable starting material is the mineral granate $(3(R^{II}O).R_2^{III}O_3.3SiO_2$, where $R^{II}$ may be Mg, Fe and/or Ca and $R^{III}$ may be Al or Fe). Since the most favourable composition of the starting material for the silicate polymerization has been found to lie on the acid side of olivine, the olivine material should be admixed with, for example, approximately 10 percent by weight $SiO_2$. Correspondingly, the granate material should be admixed with iron and/or magnesium oxide materials to optimal stoichiometric composition, wherewith hydratizable oxide materials should be slaked prior to the autoclaving process. It is an advantage when the olivine and granate material are mixed in a manner such as to render the supply of additive material unnecessary. In other words, when the starting material comprises substantially olivine, up to 15% by weight of silica may be added thereto. The starting material may further include up to 3% by weight fired and flaked magnesite, dolomite or limestone. When the starting material comprises substantially granate mineral, up to 10% by weight fired and slaked magnesite, dolomite, or limestone may be added thereto. The starting material may also include up to 5% by weight pyrite cinders.

During the hydrothermal process of the autoclaving process, the reaction by which the crystals of the silicate polymer are formed obviously takes place via a gel stage. Normally it is important that the silicate polymer material is maintained somewhat dispersed, particularly during the first stage of the hydrothermal treatment process, since otherwise there is a risk that the material will agglomerate. The starting material should therefore be charged to the autoclave, dispersed in the process or autoclaving medium charged to said autoclave, and, if possible, then held in a fluidized or suspended state.

In order for the reaction to take place at a sufficient speed and under the aforementioned conditions, the starting material should be ground to an extreme degree of fineness prior to the hydrothermal treatment process. In this regard it has been found necessary to grind the material to a specific surface area of at least 15,000 $cm^2/cm^3$ according to Blaine, while the most advantageous result is obtained when the material is ground to a specific surface area in excess of 40,000 $cm^2/cm^3$. It has been found that the quickest and most complete hydrothermal reactions are obtained when the ingredients are ground together during the fine-grinding process whilst being intimately mixed and subjected to a certain mechano-chemical reaction.

It is possible to control, to some extent, the size of the crystals of the polymeric silicate material by varying the residence time at the highest temperature during the steam treatment process. The treatment is maintained at its maximum temperature for a period of 1–10 hours, preferably 4–6 hours. During the residence time there is obtained a certain crystal growth. At the same time, it may be important to continue the cooling period subsequent to the hydrothermal treatment process for a length of time such that any gel substances which form will have sufficient time to crystallize together with the previously formed crystals. Thus, the cooling period is over at least one hour, preferably over at least three hours. With respect to the continued handling of the material, it may be necessary to introduce an anti-caking agent, for example finely divided cationic surfactants, during the final stage of the process.

EXAMPLE 1

Olivine rock, containing 94 percent by weight pure olivine, comprising a composite crystallite of 95 percent by weight forsterite and 5 parts by weight fayalite, 2 percent by weight serpentine and 4 percent by weight impurities comprising mainly magnetite, chromite and aluminium silicates, were coarsely ground and mixed with 3 percent by weight quartz sand. The mixture was then ground in a vibratory mill to fine powder form having a specific surface area (measured according to Blaine) of 45,000 cm$^2$/cm$^3$. The powder was then slurried with water to form a pulp containing 80 percent by weight water and 20 percent by weight powder, and the slurry was then passed to a container made from stainless steel which in turn was inserted into an autoclave, the slurry occupying approximately one third of the space of the container. The temperature and pressure in the autoclave and in the container were raised progressively to 218° C. and 20 atm above atmospheric over a period of time of 3 hours, whereafter temperature and pressure were maintained at said values for 2 hours. The autoclaved mass in the container was then permitted to cool progressively for 2 hours, the autoclave and container being opened at a temperature of roughly 120° C. in a manner such that water present in the container was permitted, in its entirety, to escape in the form of steam. The thus dried mass was then removed from the autoclave and disintegrated in a disintegrator and windsifted to separate non-reacted material. Approximately 68 percent by weight of the original powder had formed a polymeric silicate material which was extremely voluminous and which had the form of very thin flakes and fibres. This material could be slurried in water, optionally in the presence of a suitable filling additive, such as talcum, and could be formed into a flexible refractory web on a paper-manufacturing machine modified for this purpose.

EXAMPLE 2

A starting material comprising 40 percent by weight of a granate mineral, substantially in the form of magnesium silicates and aluminium silicates, and 60 percent by weight of natural olivine mineral, substantially in the form of a slightly iron-containing magnesium silicate, were ground in a vibratory mill to fine powder form having a specific surface area (according to Blaine) of 40,000 cm$^2$/cm$^3$. The powder was then slurried in water to form a pulp, containing 70 percent by weight water and 30 percent by weight powder. This pulp was then passed to a container in an autoclave and hydrothermally treated therein in a manner similar to that described in Example 1. The autoclaving temperature was, however, increased to 220° C. over 3 hours and was maintained at this temperature and corresponding pressure for 20 hours. The mass was then allowed to cool for 3 hours. The resultant dry material was then disintegrated in a hammer mill, there being obtained a highly voluminous material rich in flake and fibre-like particles, which could be used to advantage in its entirety as a refractory insulating material.

EXAMPLE 3

A starting material comprising approximately 67 percent by weight fayalite slag obtained from a copper smelting plant, and approximately 33 percent by weight olivine rock of the type described in Example 1, were ground in a vibratory mill to fine powder form having a specific surface area (measured according to Blaine) of 50,000 cm$^2$/cm$^3$. The powder was then slurried in water to form a pulp containing 80 percent by weight water and 20 percent by weight powder, the pulp then being transferred to a container in an autoclave and subjected to a hydrothermal treatment therein in a manner similar to that described in Example 1. The autoclaving temperature was increased to 205° C. over a period of 3 hours and was maintained at this temperature, and corresponding pressure, for 5 hours, whereafter the mass was allowed to cool over a period of 2 hours. The thus formed dry material was then disintegrated in a disintegrator, there being obtained an extremely voluminous material comprising flake- and fibre-like particles. The material thus obtained could be used, in its entirety, to replace organic fibrous material in tar board in the manufacture of roofing and like materials.

We claim:

1. A particulate silicate material having substantially a fibre- or flake-like microstructure which is suitable for use as an insulating material and as a substitute for organic fibres in paper- and board-like webs and sheets, said particulate silicate material being formed by hydrothermally treating a slurry of a pulverent staring material at a temperature of approximately 175° to 325° C. and at a pH of at least 9 in the presence of water or condensed steam, said starting material having a specific surface of at least 40,000 cm$^2$/cm$^3$ (measured according to Blaine) and consisting essentially of a natural or synthetic silicate material having a hardness exceeding 6 on the Moh's hardness scale and being at least one of the compounds having the general formulae $$2(R^I O).SiO_2$$

wherein $R^I$ may be the same or different and is selected from the group consisting of Mg and Fe; and $$3(R^{II}O).R_2^{III}O_3.3SiO_2$$

wherein $R^{II}$ may be the same or different and is selected from the group consisting of Mg, Fe, and Ca, and $R^{III}$ is Al or Fe.

2. A material according to claim 1, characterized in that the stoichiometric composition of the starting material is adjusted to one which is substantially optimal for the formation of a hydrous silicate material having a fibre- and/or flake-like crystallization structure, by adding at least one substance from the group of silica, iron oxides and hydroxides of MgO and CaO.

3. A material according to claim 1, characterized in that the starting material is substantially olivine with a silica addition of up to 15 percent by weight.

4. A material according to claim 3, characterized in that the starting material is also given an addition of up to 3 percent by weight fired and slaked magnesite, dolomite or limestone.

5. A material according to claim 1, characterized in that the starting material is substantially granate mineral with an addition of up to 10 percent by weight fired and slaked magnesite, dolomite or limestone.

6. A material according to claim 1, characterized in that the starting material is given an addition of up to 5 percent by weight pyrite cinders.

7. A material according to claim 1, characterized in that the starting material is substantially a mixture of olivine and granate mineral.

8. A method for manufacturing a particulate silicate material having a substantially fibre- or flake-like microstructure which is suitable for use as an insulating material and as a substitute for organic fibres in paper- and board-like webs and sheets, comprising hydrothermally treating a slurry of a starting material at a temperature of approximately 175° to 325° C. and at a pH of at least 9 in the presence of water or condensed steam, said starting material consisting essentially of natural or synthetic silicate material having a hardness exceeding 6 on the Moh's hardness scale and being at least one of the compounds having the general formulae $$2(R^I O)\cdot SiO_2$$

wherein $R^I$ may be the same or different and is selected from the group consisting of Mg and Fe; and $$3(R^{II}O)\cdot R_2^{III}O_3\cdot 3SiO_2$$

wherein $R^{II}$ may be the same or different and is selected from the group consisting of Mg, Fe, and Ca, and $R^{III}$ is Al or Fe, said starting material being finely divided to a specific surface area of at least 40,000 cm$^2$/cm$^3$ (measured according to Blaine).

9. A method according to claim 8, characterized in that the powderous starting material is maintained suspended during at least the initial stage of the hydrothermal treatment process.

10. A method according to claim 8, characterized in that subsequent to reaching the maximum temperature of the hydrothermal treatment cycle, the material is cooled over a period of time of at least 1–3 hours.

11. A method according to claim 8, characterized in that the hydrothermal treatment process is maintained at its maximum temperature for a period of at least 1–10 hours.

12. A method according to claim 8, characterized in that the composition of the starting material is adjusted stoichiometrically to one which is substantially optimum for the formation of a hydrous silicate material having a fibre and/or flake-like crystallization structure, by adding at least one substance from the group of silica, oxides of iron and hydroxides of MgO and CaO.

13. A method according to claim 8, characterized in that there is used a starting material of mainly olivine and up to 15 percent by weight SiO$_2$.

14. A method according to claim 13, characterized in that the starting material is also given an addition of up to 3 percent by weight fired and slaked magnesite, dolomite or limestone.

15. A method according to claim 8, characterized in that there is used a starting material of mainly granate mineral and up to 10 percent by weight fired and slaked magnesite, dolomite or limestone.

16. A method according to claim 8, characterized in that the starting material is given an addition of up to 5 percent by weight pyrite cinders.

17. A method according to claim 8, characterized in that the starting material used is a mixture of olivine and granate mineral.

18. A method according to claim 8, characterized in that the ingredients of the starting material are ground together.

19. A method according to claim 8, characterized in that the formed silicate material is slurried and formed on a paper machine or the like into a paper- or paperboard-like web or sheet.

20. A method according to claim 8, characterized in that the fibres or flakes formed are held apart in at least the final stage of the hydrothermal treatment process by adding thereto a caking-preventing agent.

21. A material according to claim 1, characterized in that said natural or synthetic silicate mineral is selected from the group consisting of natural olivine, synthetic olivine, and granate material.

22. A method according to claim 8, characterized in that said natural or synthetic silicate mineral is natural or synthetic granate mineral.

23. A method according to claim 11, characterized in that the hydrothermal treatment process is maintained at its maximum temperature for a period of at least 4–6 hours.

* * * * *